United States Patent
Dunsmore et al.

(10) Patent No.: US 7,231,308 B2
(45) Date of Patent: Jun. 12, 2007

(54) TEST SYSTEM DYNAMIC RANGE EXTENSION THROUGH COMPRESSION COMPENSATION

(75) Inventors: Joel P. Dunsmore, Sebastopol, CA (US); Michael Marzalek, Bodega Bay, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 874 days.

(21) Appl. No.: 10/027,751

(22) Filed: Dec. 21, 2001

(65) Prior Publication Data

US 2003/0125894 A1 Jul. 3, 2003

(51) Int. Cl.
*G01R 35/00* (2006.01)

(52) U.S. Cl. .................................................... 702/106

(58) Field of Classification Search .................. 702/85, 702/106; 327/427; 348/390.1; 324/601, 324/642; 600/430; 375/341, 262; 356/5
See application file for complete search history.

(56) References Cited

U.S. PATENT DOCUMENTS

| | | | | |
|---|---|---|---|---|
| 4,601,044 A | * | 7/1986 | Kromer et al. ............. 375/286 |
| 4,933,641 A | * | 6/1990 | Hsiung et al. .............. 327/351 |
| 5,079,735 A | * | 1/1992 | Apostolos ................... 708/821 |
| 5,122,875 A | * | 6/1992 | Raychaudhuri et al. .. 348/390.1 |
| 5,245,347 A | * | 9/1993 | Bonta et al. ................. 342/149 |
| 5,375,255 A | * | 12/1994 | Baier et al. ................... 455/72 |
| 5,491,548 A | * | 2/1996 | Bell et al. ................... 356/73.1 |
| 5,507,023 A | * | 4/1996 | Suganuma et al. ....... 455/234.1 |
| 5,572,160 A | * | 11/1996 | Wadell ........................ 327/427 |
| 5,587,934 A | * | 12/1996 | Oldfield et al. .............. 702/85 |
| 5,758,273 A | * | 5/1998 | Marks ...................... 455/240.1 |
| 5,773,985 A | * | 6/1998 | Bradley ....................... 324/642 |
| 5,825,669 A | * | 10/1998 | Oldfield et al. ............... 702/85 |
| 5,896,103 A | * | 4/1999 | Bunch ........................ 342/174 |
| 5,978,665 A | * | 11/1999 | Kim ......................... 455/249.1 |
| 6,005,897 A | * | 12/1999 | McCallister et al. ........ 375/340 |
| 6,066,953 A | * | 5/2000 | Wadell ....................... 324/601 |
| 6,078,281 A | * | 6/2000 | Milkovich et al. .......... 342/196 |
| 6,134,430 A | * | 10/2000 | Younis et al. ............... 455/340 |
| 6,147,501 A | * | 11/2000 | Chodora ..................... 324/601 |
| 6,252,536 B1 | * | 6/2001 | Johnson et al. ............. 341/155 |
| 6,289,048 B1 | * | 9/2001 | Richards et al. ............ 375/235 |
| 6,300,775 B1 | * | 10/2001 | Peach et al. ................ 324/601 |
| 6,507,244 B2 | * | 1/2003 | Duperray .................... 330/136 |
| 6,507,628 B1 | * | 1/2003 | McCallister et al. ........ 375/341 |
| 6,529,844 B1 | * | 3/2003 | Kapetanic et al. ............ 702/85 |
| 6,606,583 B1 | * | 8/2003 | Sternberg et al. ........... 702/191 |
| 2003/0088180 A1 | * | 5/2003 | Van Veen et al. ........... 600/430 |
| 2003/0124999 A1 | * | 7/2003 | Parssinen et al. ........ 455/226.1 |
| 2003/0125894 A1 | * | 7/2003 | Dunsmore et al. .......... 702/109 |

* cited by examiner

*Primary Examiner*—John Barlow
*Assistant Examiner*—Aditya S. Bhat

(57) ABSTRACT

A method for extending dynamic range and a test system with extended dynamic range compensate for a compression effect on measured data caused by a receiver channel of the test system being compressed. The measured data is magnitude and phase data for one of a device under test and a signal under test that is measured using the test system. The method comprises characterizing a first channel of the test system for first channel compression responses to magnitude and phase, characterizing a second channel of the test system for second channel compression response to magnitude and phase, and compensating to correct for the effect of compression on the measured data. The test system comprises a receiver channel, and a computer program stored in memory that implements the method. Test systems with a plurality of receiver channels may be characterized in pairs.

30 Claims, 6 Drawing Sheets

TEST SYSTEM DYNAMIC RANGE EXTENSION THROUGH COMPRESSION COMPENSATION

TECHNICAL FIELD

The invention relates to test systems. In particular, the present invention relates to extending dynamic range of test systems such as vector network analyzers and vector spectrum analyzers.

BACKGROUND ART

Test systems are critical to the design, manufacture and maintenance of modern radar and communications systems and their component electronic devices. Among a wide variety of test systems that are routinely employed are scalar and vector network analyzers, spectrum analyzers, and power meters. While each different type of test system typically characterizes a device under test (DUT) in a manner consistent with a design of the test system, most test systems share certain performance characteristics. In particular, many test systems can be characterized by a commonly used measure of performance known as dynamic range.

In general terms, dynamic range is defined as a difference between a minimum signal power level and a maximum signal power level that can be measured by the test system. In particular, the minimum and maximum power levels are usually those for which the system can meet a certain pre-defined accuracy specification. A noise floor of the system typically determines the minimum signal level or system sensitivity, while the maximum signal level is usually set or determined by a compression point or level of the system. Thus, the test system generally provides accurate measurements of a signal from a device under test (DUT), given that the signal level lies between the noise floor and the compression point of the system.

As mentioned above, the noise floor of the test system typically sets a lower end of the dynamic range of the test system. The noise floor, referenced to the input of the system, is determined by the system noise figure, a measure of noise power added by the system, and the system bandwidth. In essence, a signal that has a power level above the noise floor can be distinguished from noise and thus detected and measured. However, the presence of the noise tends to interfere with and ultimately corrupt signal detection and measurement. Therefore, the signal must not only be above the noise floor, but above the noise floor by a sufficient amount to be reliably detected and accurately measured. As such, the lower end of the dynamic range of the test system generally accounts for, or is set by, a minimum signal to noise ratio (SNR) level, below which measurement accuracy and/or detection reliability cannot be maintained.

The compression point or compression limit of the system typically sets an upper end of the dynamic range in most test systems. In general terms, the compression point is a maximum signal power level beyond which the system response becomes sufficiently non-linear to adversely affect measurement accuracy. A system response is considered linear if a magnitude and a phase response of a system do not change (i.e., are essentially constant) with respect to changing input signal power levels. However, a point eventually will be reached where the magnitude and/or phase response is no longer constant as signal power increases. This point is known as the compression point. The amount of compression that can be tolerated by a given system is case specific. For example, in many systems the allowable amount of compression is limited to a very small amount, typically less than 0.2 dB, at a maximum input power in order to meet the system measurement accuracy specification.

High dynamic range is very important to test systems. For example, consider a network analyzer used to measure S-parameters of a DUT. The dynamic range of the network analyzer, in part, determines the ability of the network analyzer to distinguish between a passband and a stop band of the DUT. For example, a filter can have a stop band that is many tens of decibels (dB) below the passband of the device. Thus, when the DUT is a filter, the network analyzer needs to be able to measure a transmission S-parameter that can vary by as much as 80 dB or more. In other applications, the need to characterize DUTs that have a very low return loss, while simultaneously providing a very low transmission loss, necessitates high dynamic range on the part of the network analyzer. High dynamic range also facilitates accurate measurement of full two-port S-parameters for active devices, such as amplifiers, especially those with very high forward gain and/or very low reverse gain. Thus, providing for high dynamic range in network analyzers is an important consideration. In short, test systems, such as vector network analyzers, generally depend upon an amplitude or magnitude response and a phase response of the receivers of the network analyzer test system to be linear over a wide or high dynamic range.

Conventional approaches to providing high dynamic range in such test systems generally involve improving the system noise figure and/or increasing or raising the compression point of the system. Therefore, some test systems, such as a network analyzer, use low noise amplifiers (LNAs) either in front of the standard receivers or incorporated into a front end of the receivers. An LNA is an amplifier that has a low noise figure. The use of the LNA reduces the overall noise figure of the test system. The lower system noise figure reduces the system noise floor and, in turn, improves the dynamic range at the low end. Unfortunately, LNAs are typically low power, and thus have relatively low compression points. The low compression point of the LNA limits the system compression point and the system dynamic range at the high end.

Alternatively, increasing the high end of the dynamic range of the system generally involves using padding, high power amplifiers, or other means to increase the compression point of the receivers of the system. Unfortunately, the use of padding and high power amplifiers generally results in an increase in system noise figure and a concomitant reduction of dynamic range at the low end. Thus, system dynamic range is generally maximized by a judicious trade-off between low-end performance and high-end performance on the part of components that make up the system. In some systems, most notably power meters and spectrum analyzers, that measure signal magnitude but not signal phase, techniques of amplitude or magnitude linearization sometimes are employed to minimize the effects of compression. These techniques compensate for amplitude compression and thus, are not very useful for systems that perform vector measurements such as magnitude and phase of a vector network analyzer.

Accordingly, it would be desirable to be able to extend test system dynamic range, especially for test systems that measure vector quantities such as amplitude and phase. Furthermore, it would be desirable if such a dynamic range extension did not require or depend on changing the architecture of test system or improving the performance of components used in the test system. Such an extended dynamic range would solve a long-standing need in the area of test systems that measure amplitude and phase of networks and DUTs.

SUMMARY OF THE INVENTION

According to embodiments, the present invention provides a method of extending a dynamic range of a test system and a test system with extended dynamic range. The present invention extends the dynamic range by compensating for the effects of receiver channel compression of the test system. The channel compression compensation of the present invention facilitates measurements, especially vector measurements of a device under test (DUT) or signal under test (SUT). In particular, the compensation applies to compression effects in both a magnitude response and a phase response of the test system. Furthermore, the present invention is applicable to test systems having one or more receiver channels that experience a dynamic range limitation due to receiver channel compression. In particular, the present invention is applicable to test systems, such as vector network analyzers and vector spectrum analyzers, that measure magnitude and phase or equivalent data for a DUT.

In one aspect of the invention, a method of extending dynamic range of a test system is provided. The method comprises characterizing magnitude and phase compression responses of a first or reference channel of the test system. Characterizing the first channel comprises applying an input signal having a plurality of power levels to an input of the first channel and to an input of a second channel of the test system. Each power level of the plurality is different and chosen such that the first channel is driven into compression for at least one of the power levels while the second channel is not driven into compression for any of the power levels. Characterizing the first channel further comprises measuring a magnitude or amplitude compression response and a phase compression response of the first channel. The phase response is measured relative to the second channel. Characterizing the first channel further comprises determining a magnitude compensation and a phase compensation of the first channel as a function of the plurality of power levels.

The method of extending dynamic range further comprises characterizing magnitude and phase compression responses of the second channel. In some embodiments, characterizing the second channel comprises applying another input signal having another plurality of power levels to the input of the first channel and to the input of the second channel of the test system. Each power level of the other plurality is different and the other plurality is chosen such that the second channel is driven into compression for at least one of the power levels. Characterizing the second channel further comprises measuring a magnitude or amplitude compression response and a phase compression response of the second channel. The phase compression response is measured relative to the first channel. Characterizing the second channel further comprises determining a magnitude compensation and a phase compensation of the second channel as a function of the plurality of power levels.

The method of extending dynamic range further comprises compensating measured magnitude and phase data to correct for the effect of the compression on the data. In some embodiments, the measured data is of a device under test (DUT) and in other embodiments, the measured data is of a signal under test (SUT). The compensation is for the effects of compression of one or more of the first channel and the second channel that may have occurred during a measurement. Compensating comprises applying the magnitude and phase compensations that were determined for the first channel and the second channel to the measured data.

Characterizing the first channel and the second channel are collectively referred to as 'calibration' steps while compensating is referred to as a measurement step. Calibration steps need only be performed periodically, while the measurement step may be applied to every measurement. Moreover, the method of the present invention can be extended to any number of channels by sequentially repeating the characterizations of the first channel and of the second channel for different pairs of channels. The method of the present invention may be used to compensate for compression effects over a range of frequencies by repeating characterizations of the first channel and of the second channel at a plurality of frequencies within the range of frequencies.

In another aspect of the present invention, a test system having extended dynamic range is provided. The test system comprises a receiver channel, a controller, and a computer program stored in memory. The controller executes the computer program. A signal received by the receiver channel has a plurality of power levels. The power levels of the plurality are chosen so that at least one level, when applied to an input of the channel, will cause the channel to compress. The receiver channel receives and measures magnitude and phase of the signal. The controller processes data generated by the receiver channel. In particular, the controller, through the execution of the computer program, compensates the data from the receiver channel for compression effects of the channel. Preferably, the computer program implements the method of the present invention.

In some embodiments of the test system, a limiter or equivalent non-linear device is inserted at the input the receiver channel. The limiter protects the receiver channel and helps to insure a relatively well-behaved compression characteristic of a combination of the receiver and the limiter. The compensation applied to measured data for the receiver channel includes compression effects of the limiter. The test system may be a network analyzer or a spectrum analyzer, for example. In the form of a vector network analyzer, the test system has more than one receiver channel.

By allowing the receiver or receiver plus limiter to be driven far into compression, the high end of the receiver dynamic range of the test system is increased according to the present invention. This effectively increases overall dynamic range without a loss of sensitivity and accuracy of the test system. Moreover, the present invention does not require a change to the receiver hardware or architecture, but includes a 'calibration' step and mathematical or software manipulation of the data. Certain embodiments of the present invention have other advantages in addition to and in lieu of the advantages described hereinabove. These and other features and advantages of the invention are detailed below with reference to the following drawings.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

Figure 1:
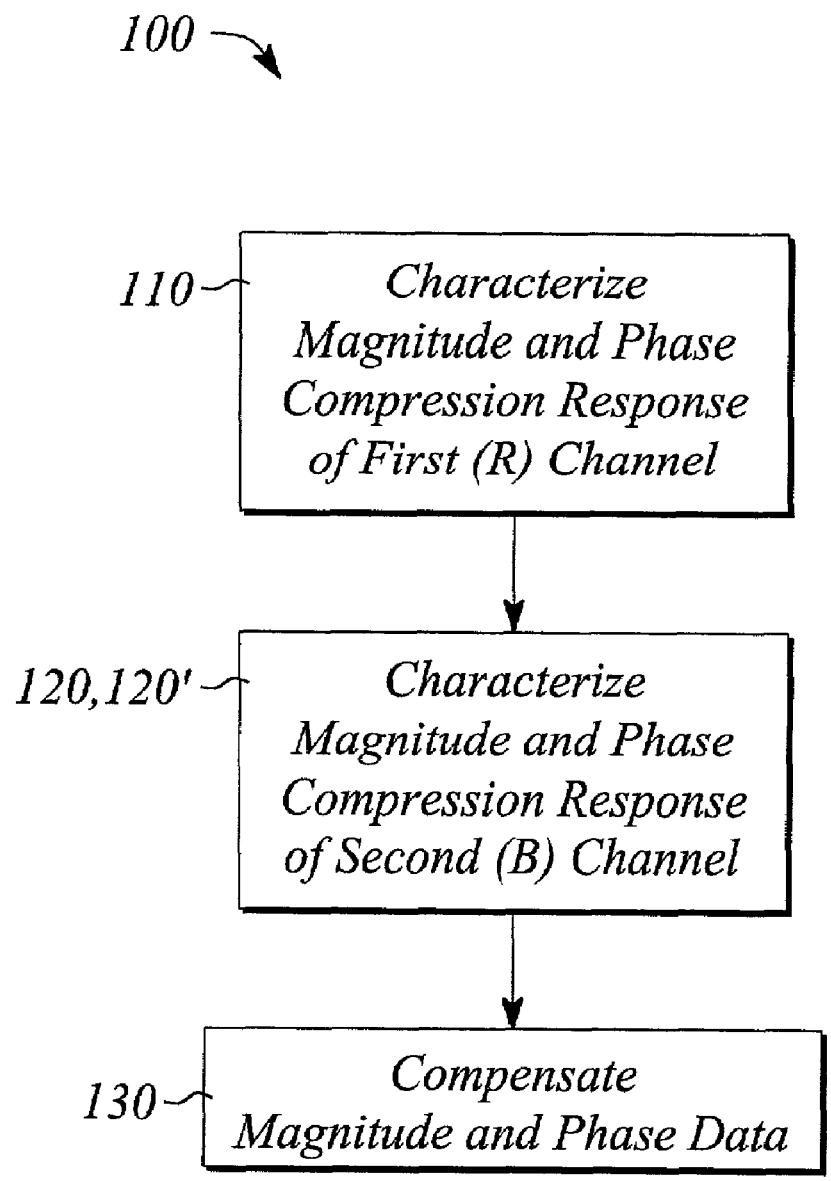
FIG. 1 illustrates a flow chart of a method of extending dynamic range of a test system according the present invention.

The present invention extends a dynamic range of a test system through compression compensation. In particular, the present invention provides compression compensation for vector measurements, such as magnitude and phase, produced by the test system. In simple terms, mathematical compensation is developed and applied to data generated by the test system. The mathematical compensation mitigates the effects of receiver channel compression in the test system. The method is applicable to a variety of vector test systems including, but not limited to, a vector network analyzer and a vector spectrum analyzer.

As used herein, the term 'compression' refers to an observed deviation from an ideal or linear response characteristic of a device or system as a result of an application of a signal having a sufficiently high power level. Theoretically, the device operates as a linear device at input signal power levels below a compression point or level, while at power levels above the compression point, the device exhibits non-linear operation. For example, a gain of a device, such as a receiver channel, typically is constant for small signals. Thus, a 1 dB change in a power level of an input signal will produce an equivalent 1 dB change in an output signal as long as the signal is below a compression point or level of the device. This constant gain is often referred to as the linear or small signal gain of the device. However, as the power level of the input signal is increased, the gain of the device eventually ceases being constant due to inherent nonlinearities in the device. The power level at which the gain ceases being constant is called the compression point of the device. In most cases, at power levels above the compression point, the gain generally decreases with increasing signal power. However, in some cases the gain may increase or increase and then decrease with increasing power. All of these cases of nonlinear operation are referred to herein as compression. The range of input signal levels for which the gain is constant is referred to as a linear range of the device.

Unfortunately, most real devices, especially active devices, such as receiver channels, exhibit some nonlinear behavior even at very small signal levels. In practice, there is no definitive transition point between linear and nonlinear operation in most devices. On the other hand, the observed nonlinear behavior exhibited by a device is typically very small at small signal levels. Thus for small signals, the effect of the inherent device nonlinearities is typically small enough with respect to an overall performance of the device that the nonlinear performance can be ignored, and for all intents and purposes, the device can be considered a linear device. Moreover, since there is no definitive transition between linear and nonlinear operation, devices typically are characterized by a power level that causes a particular amount of deviation from essentially linear behavior or performance. For example, many amplifiers are characterized by a 1-dB compression point. The 1-dB compression point of an amplifier is a power level of an input signal that causes the gain of the amplifier to change (i.e., generally to decrease) from its small signal gain by an amount of 1 dB. One of ordinary skill in the art is familiar with compression and, in particular, a 1-dB compression point of an amplifier.

With respect to a receiver channel of a test system, a variation in gain due to compression of a component or components, such as an amplifier, within the channel translates into a variation in a measured magnitude of the signal as produced by the receiver channel. The variation in measured magnitude of a signal is referred to herein as the magnitude response of the receiver. The variation in the magnitude response due to channel compression results in an error in measured magnitude data generated by the receiver as a function of signal power level. Generally, the larger is the signal power level, the greater is the magnitude error. The magnitude error is not a function of a DUT performance or SUT characteristic and thus, will tend to interfere with the measurement of the magnitude response of the DUT or SUT.

Phase response in a device is also affected by compression. In particular, the phase response of a device at a given frequency may be constant over a range of signal power levels where the levels are small. However, as the signal level increases, the phase will often deviate from the constant value and become variable. Thus, as with gain, the phase response of a receiver is affected by compression of the receiver.

In most test systems, phase of a signal is generally measured as a difference between the phase of the signal at a particular point in a first or reference receiver channel and the phase of the signal at a particular point in a second receiver channel. As the power level of the signal is increased and one or both of the channels enters compression, the phase response through one or both of the channels will begin to deviate from its small signal value. Since the phase is measured as a difference between the phases of the signal in the two channels, the end result will be a deviation in measured phase as a result of receiver channel compression. Since the deviation is not a function of the DUT, its presence interferes with the measurement of the DUT phase response.

In some test systems, such as a vector spectrum analyzer for example, phase is measured using a single receiver channel. In such situations, phase is either typically measured as a phase deviation from an expected phase (e.g., phase modulation) or is measured relative to an independent phase reference typically internal to the test system. Single channel phase measurement is sometimes called 'self-referencing' phase measurement. For example, phase may be measured as a phase deviation based on an internal time reference of the test system. Essentially, if the test system is synchronized in some manner to a signal source, a single receiver phase measurement may be made as a deviation of measured versus expected phase. Moreover, a single receiver phase measurement can be viewed as a two-receiver phase measurement wherein the reference receiver channel is an 'implicit' channel. The performance of the implicit reference channel can still affect phase measurements. However, the implicit reference channel does not actually suffer channel compression as such.

An equivalent situation involving magnitude and phase compression effects occurs when a limiter or another inherently non-linear device is used at a front end of a receiver channel. Limiters are known in the art and are often employed at the front end of receiver channels to help protect the receivers from the damaging effects of high-level signals. Limiters may also be employed to produce a well-behaved (i.e., monotonic) compression response. In particular, a limiter advantageously may be used if a given receiver exhibits a compression response that is not monotonic. When a limiter is used, the limiter is chosen such that it compresses at a somewhat lower power level than the receiver so that the compression response of the limiter dominates the compression response of the limiter/receiver combination.

As with the receiver alone, the use of a limiter can, and usually does, produce magnitude and phase variations due to compression. From the standpoint of the measured magnitude and phase response produced by the channel, according to the present invention, compression of the limiter and compression of the receiver channel are essentially equivalent and indistinguishable. Therefore, for simplicity of discussion hereinbelow, compression of a receiver channel is understood to refer to either compression of the receiver channel itself or compression of a non-linear device, such as a limiter, used at an input of the receiver. In essence, if a limiter is employed, the limiter is considered to be part of the receiver channel according to the present invention.

In one aspect of the invention, a method 100 of extending dynamic range of a test system using compression compensation is provided. FIG. 1 illustrates a flow chart of the method 100 of extending dynamic range of the present invention. The method 100 is essentially described below with reference to test systems that test a device under test (DUT). However, the method 100 is equally applicable to test systems that test a signal under test (SUT). One skilled in the art can readily substitute 'DUT' for 'SUT' in the description below. The method 100 comprises characterizing 110 a magnitude or amplitude compression response and a phase compression response of a first or reference (R) channel of the test system. During characterization, the R channel is driven into compression and the deviation from its linear behavior is determined. From the determined deviation, a compensation function or relation can be developed. The compensation function can then be used later in the method 100 to correct data measured for a DUT using the R channel.

Figure 2:
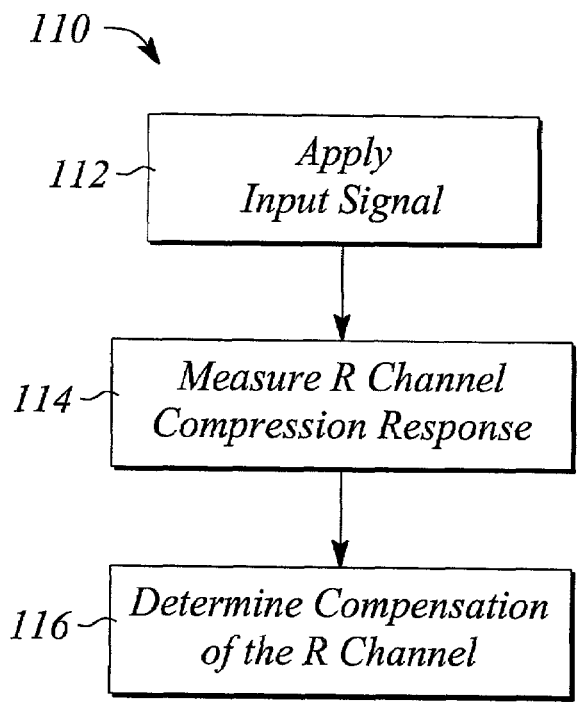
FIG. 2 illustrates a flow chart of characterizing a magnitude and phase compression of a first channel according to the present invention.

FIG. 2 illustrates a flow chart of one embodiment of characterizing 110 the R channel. In this embodiment, characterizing 110 the R channel comprises applying 112 a first input signal having a first plurality of power levels to an input of the reference channel and to an input of a second or B channel of the test system. Each of the first plurality of power levels is applied individually and sequentially to the inputs. The first plurality of power levels is selected such that the R channel is driven into compression for at least one of the power levels.

While the R channel is driven into compression for at least one power level of the first input signal, the B channel should not be driven into compression for any of the power levels. In a preferred embodiment, a linear device, such as an attenuator, is inserted between the signal source and the input of the B channel. The attenuator reduces the power level of the first input signal applied to the B channel to a level below that necessary to compress the B channel.

Characterizing 110 the R channel further comprises measuring 114 a magnitude compression response and a phase compression response of the R channel. The phase response is measured 114 relative to the B channel. Since the B channel is not in compression, any deviation from linear phase observed in the measured 114 phase response is assumed to be due to the compression of the R channel.

For example, consider an input signal applied 112 to the inputs of the R channel and the B channel, wherein the input signal can have any one of three power levels, the levels being −10 dBm, 0 dBm, and 10 dBm, respectively. Initially, the input signal having the −10 dBm power level is applied to the inputs of the R channel and the B channel and the magnitude and phase responses of the channels are measured 114. The power level of the input signal is increased to the 0 dBm power level and the magnitude and phase responses of the channels are again measured 114. Finally, the input signal power level is increased to 10 dBm and the magnitude and phase responses are measured 114. Thus, for each input power level a separate magnitude value and a separate phase value are measured 114.

Assume that in this example the R channel is driven into compression when the input signal having a power level of either 0 dB or 10 dBm is applied 112 and that the R channel is not in compression when the input signal power level is −10 dBm. Moreover, assume that the B channel is not in compression for any of the signal power levels. Thus, the measured 114 magnitude and phase responses for the R channel will include two sets of measured data, namely data for the 0 dBm and data for the 10 dBm power levels, that include the effects of R channel compression. Meanwhile, the measured 114 magnitude and phase responses for the B channel represent only data for a linear or uncompressed channel.

Characterizing 110 the R channel further comprises determining 116 a magnitude compensation and a phase compensation of the R channel as a function of the signal power level. The compensation is a relationship between the actual or measured performance of the R channel and an ideal or linear performance of the R channel. For example, the relationship can be in the form of a look-up table or curve that relates input power to deviation from the linear response. Alternatively, the relationship can be a function, such as a polynomial or power series, the coefficients of which are determined 116 by a conventional curve-fitting technique in which the function is fitted to measured deviation data. Essentially, the compensation allows the measured 114 response of the R channel to be corrected for the characterized 110 compression response, thus yielding data representative of what would have been produced had the R channel not become compressed.

As discussed hereinabove, the R channel may be an implicit channel or an explicit (i.e., actual) channel. When the R channel is an implicit channel, the characterized 110 compression magnitude and phase response actually characterizes imperfections in the implicit channel instead of characterizing an actual compression response of a receiver channel. Since imperfections in the implicit channel can and do affect the accuracy of the measured magnitude and phase produced by the test system, performing the characterization 110 on an implicit channel may produce useful information. Thus, according to the present invention, no real distinction need be made as to whether the R channel is implicit or explicit.

The method 100 of extending dynamic range further comprises characterizing 120 a magnitude or amplitude compression response and a phase compression response of the second or B channel. During characterization 120, the B channel is driven into compression and the deviation from its linear behavior is determined. From the determined deviation, a compensation function or relation is developed. The compensation function then can be used later in the method 100 to correct data measured for a DUT using the B channel.

Figure 3:
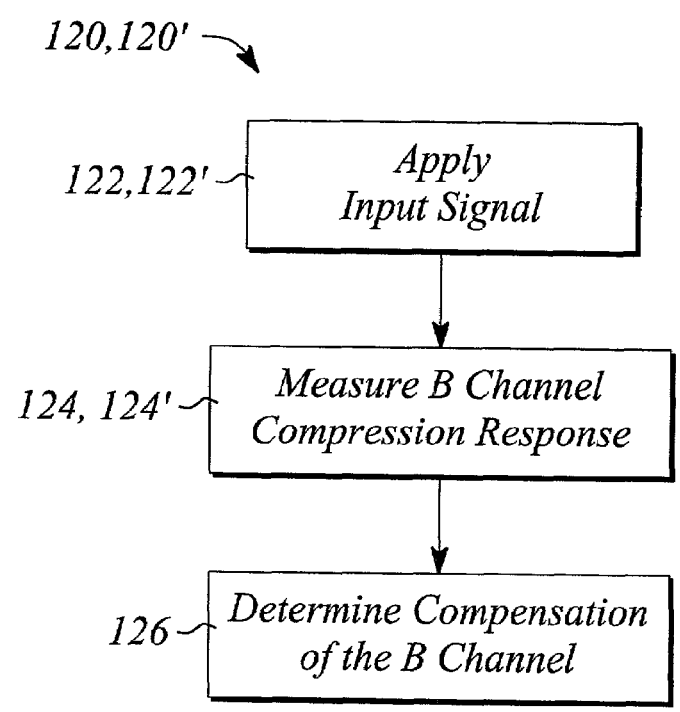
FIG. 3 illustrates a flow chart of characterizing a magnitude and phase compression of a second channel according to the present invention.

FIG. 3 illustrates an embodiment of characterizing 120 the B channel. In this embodiment, characterizing 120 the B channel comprises applying 122 a second input signal having a second plurality of power levels to the input of the B channel and to the input of the R channel of the test system. Each of the second plurality of power levels is applied 122 individually and sequentially to the inputs. The second plurality of power levels is selected such that the B channel is driven into compression for at least one of the power levels.

In this embodiment, while the B channel is driven into compression for at least one power level of the second input signal, the R channel is not driven into compression for any of these power levels. As was done in the R channel characterization 110 described hereinabove, a linear device, such as an attenuator, can be inserted between the signal source and the input of the R channel. The attenuator reduces the power level of the second input signal applied to the R channel to a level below that necessary to compress the R channel. In this way, the first input signal and the second input signal can be the same input signal.

Characterizing 120 the B channel further comprises measuring 124 a magnitude compression response and a phase compression response of the B channel. The phase response is measured 124 relative to the R channel. In this embodiment, since the R channel is not in compression, any deviation from linear phase noted in the measured 124 phase response for the B channel is assumed to be due to the compression of the B channel.

In another embodiment, characterizing 120' the B channel comprises applying 122' a third input signal having a third plurality of power levels to the input of the B channel and to the input of the R channel of the test system. Each of the third plurality of power levels is applied 122' individually and sequentially to the inputs. The third plurality of power levels is selected such that both the R channel and the B channel are driven into compression for at least one of the power levels. This embodiment of characterizing 120' the B channel is particularly useful in situations where the input of the R channel is not readily accessible, thus making it difficult to insert a linear device, such as an attenuator, to prevent the R channel from compressing when the B channel is compressed.

For this other embodiment, characterizing 120' the B channel further comprises measuring 124' a magnitude compression response and a phase compression response of the B channel. Once again, the phase response of the B channel is measured 124' relative to the R channel. However, in this case, both the R channel and the B channel are in compression. Therefore, the measured 124' or observed deviation from linear phase, as noted in the phase response measured for the B channel, may include some contribution of the R channel phase compression response. Preferably, the magnitude compression response of the R channel also is measured for the third input signal. Since the R channel phase compression response is known a priori from characterizing 110 the R channel, a portion of the measured 124' phase response due to the compression of the R channel can be mathematically removed from the measured phase response to yield the B channel phase response.

In a variation of this embodiment, a ratio of the magnitude and phase responses of the B channel and the R channel is measured (e.g., a typical B/R measurement with a vector network analyzer, not illustrated). In this embodiment variation, since both the magnitude and phase responses of the R channel are known a priori from characterizing 110 the R channel, the measured magnitude and phase responses are adjusted to mathematically remove the effects of R channel compression. Thus, even in this variation, the B channel compression response can be determined from the measured data.

Characterizing 120, 120' the B channel further comprises determining 126 a magnitude compensation and a phase compensation of the B channel as a function of the signal power level. As with the R channel, the compensation determined 126 for the B channel is a relationship (e.g., look-up table, curve, function) that converts measured data into data that would have been produced by the B channel had the channel not been in compression. Depending on the particular embodiment 120, 120', determining 126 the compensation may or may not use a priori information developed previously in characterizing 110 the R channel. Likewise, determining 126 may or may not use the measured magnitude compression response for the R channel for the third input signal.

The method 100 of extending dynamic range further comprises compensating 130 measured magnitude and phase data of a device under test (DUT) for the effects of compression of one or more of the R channel and the B channel that may have occurred during a measurement. Compensating 130 measured data comprises employing the magnitude and phase compensation determined 116, 126 for the R channel and the B channel to correct data measured for the DUT by the R channel and the B channel. How the compensation 130 is employed depends on what measurement(s) are performed on the DUT, as will be detailed by way of example hereinbelow.

Characterizing 110, 120, 120' the R channel and the B channel, respectively, are collectively referred to as 'calibration' steps, while compensating 130 data for the DUT is referred to as a measurement step. The calibration steps 110, 120, 120' need only be performed periodically while the measurement step can be applied to every measurement of the DUT. Moreover, the method 100 of the present invention can be extended to any number of channels by sequentially repeating the characterizations 110, 120, 120' for different pairs of channels. The method 100 of the present invention can be used to compensate for compression effects over a range of frequencies by repeating the characterizations 110, 120, 120' of the R channel and the B channel at a plurality of frequencies within the range of frequencies and then repeating the compensation 130 of measured data at the plurality of frequencies for DUT measurements.

For illustrative purposes and to further the discussion hereinbelow, the test system will be described in terms of a network analyzer that measures performance of a DUT. A network analyzer is a test system comprising a signal source and a plurality of receiver channels that characterizes the performance of RF and microwave devices under test (DUTs) in terms of network scattering parameters. Scattering parameters, more commonly called 'S-parameters', are reflection and transmission coefficients computed from measurements of voltage waves incident upon and reflected from a port or ports of the DUT. In general, S-parameters are given either in terms of a magnitude and phase or in an equivalent form as a complex number having a real part and an imaginary part. A network analyzer capable of measuring both the phase and the magnitude of the S-parameters of the DUT is called a vector network analyzer.

Figure 4:
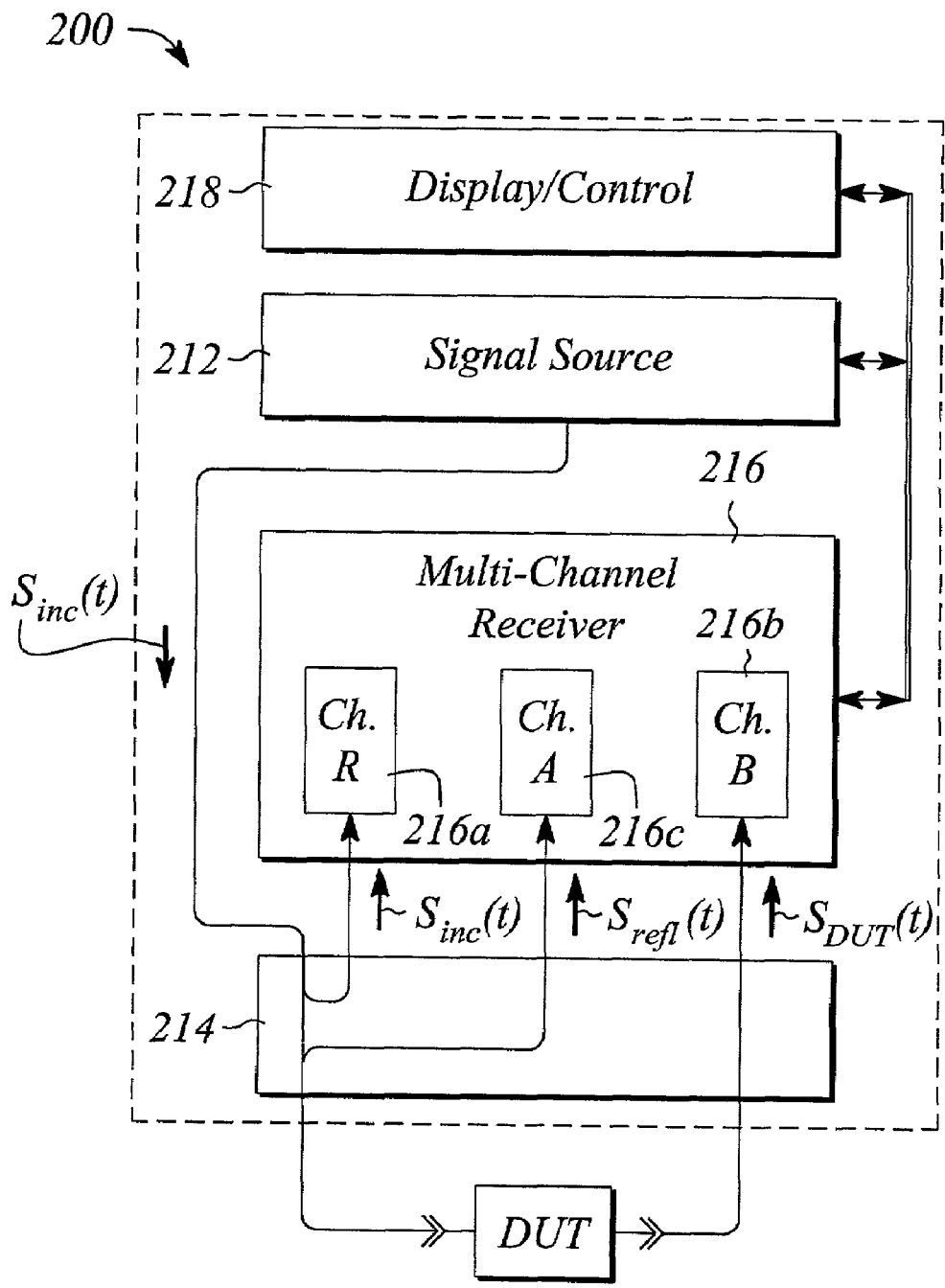
FIG. 4 illustrates a block diagram of a typical vector network analyzer that is useful for the present invention.

A block diagram of a typical vector network analyzer 200 is illustrated in FIG. 4. The vector network analyzer (VNA) 200 comprises a signal source 212, a signal separation unit or module 214, a multi-channel receiver 216, and a processor/display unit 218. The multi-channel receiver 216 typically comprises three or more receiver channels. For simplicity, only three channels are illustrated in FIG. 4.

An incident signal $S_{inc}(t)$ is generated by the signal source 212 and is applied to an input of the signal separation module 214. A portion of the incident signal $S_{inc}(t)$ is sampled by the signal separation module 214 and applied to a first or reference (R) channel 216a of the multi-channel receiver 216. A remaining portion of the incident signal $S_{inc}(t)$ passes through the signal separation module 214 and is applied to an input of the DUT.

The portion of the incident signal that is not reflected at the DUT input passes or is transmitted through the DUT and emerges at an output of the DUT. The signal $S_{DUT}(t)$ that emerges generally has been amplified or attenuated by the DUT. In addition, the signal $S_{DUT}(t)$ that emerges from the DUT also generally includes a phase response introduced by the DUT. The signal $S_{DUT}(t)$ is applied to a second or B channel 216b of the multi-channel receiver 216.

In general, a portion of the incident signal $S_{inc}(t)$ applied to the input of the DUT is reflected due to an impedance mismatch at the input of the DUT. This produces a reflected signal $S_{refl}(t)$. The reflected signal $S_{refl}(t)$ passes back into the signal separation module 214 where it is separated from the incident signal $S_{inc}(t)$. The separated, reflected signal $S_{refl}(t)$ is then applied to a third or A channel 216c of the multi-channel receiver 216.

The R channel 216a is used to monitor the signal source 212 and is used as a reference for measuring phase. In addition, measurements of the incident signal $S_{inc}(t)$ at the R channel 216a may be used to normalize measurements, thereby removing any fluctuations in the incident signal $S_{inc}(t)$ power level that may occur. The A channel 216c measures the magnitude and the phase relative to the R channel 216a of the reflected signal $S_{refl}(t)$. The B channel 216b measures the magnitude and the phase relative to the R channel 216a of the transmitted or 'thru' signal $S_{DUT}(t)$.

Thus, by taking a ratio of the measured magnitude and phase at the A channel 216c to that measured at the R channel 216a (i.e., an A/R measurement), a complex reflection coefficient or S-parameter, S11, can be computed. Similarly, by taking a ratio of the measured magnitude and phase from the B channel 216b to that for the R channel 216a (i.e., a B/R measurement), a complex transmission coefficient, S21, can be computed. In some systems, a fourth channel (not illustrated) is used in the multi-channel receiver 216 and the incident signal $S_{inc}(t)$ is alternately applied to the input and output of the DUT allowing a full set of S-parameters, known as a full two-port S-parameter measurement, to be performed.

Figure 5A:
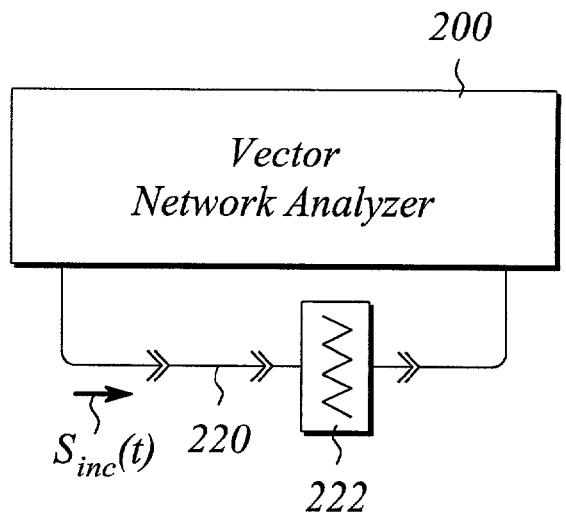
FIG. 5A illustrates a block diagram of a vector network analyzer configured according to one embodiment of characterizing a reference (R) channel of the network analyzer.
Figure 5B:
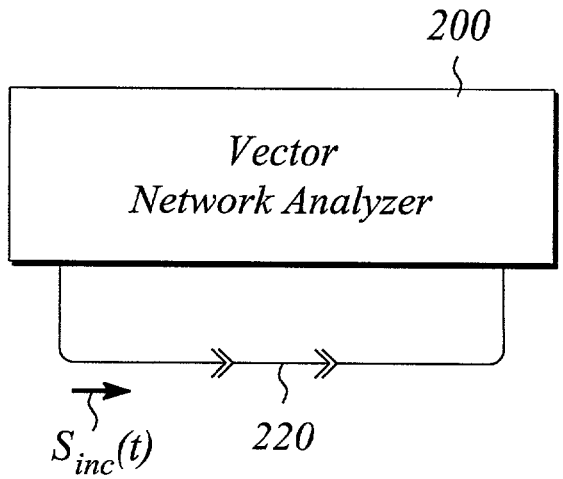
FIG. 5B illustrates a block diagram of a vector network analyzer configured according to one embodiment of characterizing a second (B) channel of the network analyzer.
Figure 5C:
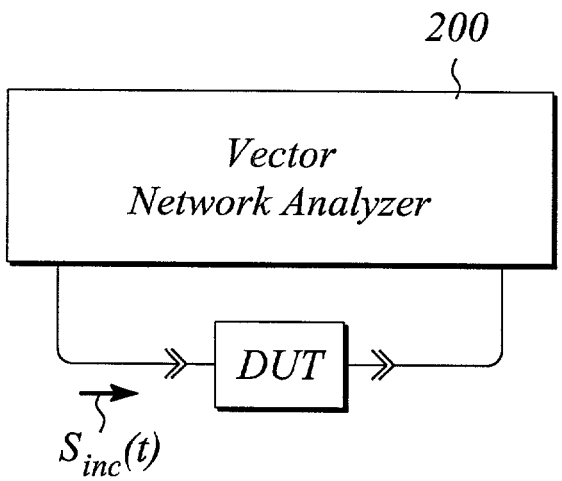
FIG. 5C illustrates a block diagram of a vector network analyzer configured to test a device under test (DUT) using compensation of measured data of the present invention to extend a dynamic range of the measured results for the DUT.

Consider, by way of example as illustrated in FIGS. 5A–5C, the application of the method 100 of extending dynamic range to the three-channel vector network analyzer 200. While performing the method 100 of extending dynamic range, the DUT of the previous discussion is replaced by a 'thru' connection 220. In addition, during the characterization 110 of the R channel, an attenuator 222 is inserted between the thru connection 220 and the input of the B channel 216b as illustrated in FIG. 5A. Alternatively, the attenuator 222 may be inserted between a sample point for the R channel 216a and a sample point for the A channel 216c within the signal separation module 214 (not illustrated). This alternate location for the attenuator is often preferable, in part, because it facilitates characterization of an A channel as well as a B channel. The incident signal $S_{inc}(t)$ for the example has three power levels P1, P2 and P3. The power levels P1 and P2 are sufficient to drive the R channel 216a into compression. The attenuator 222 is selected such that it provides sufficient attenuation of the incident signal $S_{inc}(t)$ to prevent the B channel from also being driven into compression during the characterization 110 of the R channel. However, at least one of the power levels P1, P2, and P3 are sufficient to drive the B channel 216b into compression in the absence of the attenuator 222, as will be described below. One skilled in the art would readily be able to choose an attenuator 222 with an appropriate amount of attenuation and be able to determine sufficient power levels P1, P2, P3 for a given network analyzer realization without undue experimentation.

For the present example, an attenuator 222 that provides an attenuation of 20 dB is used. Moreover, the power level P1 is approximately 10 dBm. The power level P2 is approximately 6 dB below that of P1, or about 4 dBm. The power level P3 is chosen to be near a bottom of an automatic level control range of the signal source 212, or approximately −6 dBm. The attenuation and power levels used in this example are for the illustrative purposes only and are not intended to limit the scope of the present invention.

As described hereinabove, the method 100 begins with characterizing 110 the R channel. In this example of characterizing 110 the R channel 216a magnitude and phase compression response, the incident signal $S_{inc}(t)$ is set to the first power level P1 and applied 112 to the R channel 216a and, by way of the thru connection 220 and attenuator 222, to the B channel 216b. The magnitude response and the phase response of the R channel 216a and the B channel 216b are measured 114. The incident signal $S_{inc}(t)$ is then set to the second power level P2, again applied 112 as above, and the magnitude and phase responses of the R channel 216a and the B channel 216b are measured 114. Finally, the incident signal $S_{inc}(t)$ is set to the third power level P3, applied 112 once again to the channels 216a, 216b, and the magnitude and phase responses of the R channel 216a and the B channel 216b are again measured 114. An example set of measured magnitude and phase values that might be generated in characterizing 110 the R channel is listed in Table 1. Note that, for the example described herein, phase measurements for the R channel herein always yield a result of 0 degrees since the R channel is designated as the phase reference for phase measurements.

TABLE 1

Measured magnitude and phase responses for the R channel and the B channel of the example of characterizing 110 the R channel.

| Receiver Channel | Power Level | Mag (dB) | Mag (linear) | Phase (degrees) | Phase (radians) |
|---|---|---|---|---|---|
| R | P1 | 6.4 | 2.089 | 0.0 | 0.0 |
| B | P1 | −11.1 | 0.2786 | 178 | 3.107 |
| R | P2 | 0.4 | 1.047 | 0.0 | 0.0 |
| B | P2 | −17.5 | 0.1334 | 176 | 3.072 |
| R | P3 | −9.9 | 0.3199 | 0.0 | 0.0 |
| B | P3 | −27.9 | 0.0402 | 175 | 3.054 |

An examination of these results verifies that the B channel is operating in a linear range while the R channel 216a is in compression for the first and the second power levels, P1 and P2. Moreover, since the B channel is not in compression, all of the deviation from constant phase observed in the phase response measured for the B channel 216b may be ascribed to the compression of the R channel 216a. The deviation or compression response of the R channel may be computed from these results. At the first power level P1, the R channel magnitude response deviates from an ideal, linear response by −0.5 dB (0.9441, linear) and the phase response deviates by −3 degrees (−0.05236 radians). Similarly, at the second power level P2, the R channel magnitude response deviates from an ideal, linear response by −0.1 dB (0.9886, linear) and the phase response deviates by −1 degree (0.01745 radians).

The goal of determining 116 the R channel magnitude and phase compensation is to find a correction that adjusts a set of measured magnitude and phase values to yield a set of magnitude and phase values that would have been measured had the R channel 216a not been compressed. As noted hereinabove, one approach to determining 116 the R channel magnitude and phase compensation is to fit a function to the measured results for the R channel 216a, or alternatively, to the measured deviations. The function, once fitted, enables any measured data to be corrected or compensated for the effects of compression in the R channel 216a. A pair of functions that can approximate the observed deviations of magnitude and phase response due to receiver channel compression are given below as equations (1) and (2). Equation (1), when fitted to the measured magnitude response data, can be used to compensate for magnitude compression effects while equation (2), when fitted to the measured phase response data, can provide a compensation for the phase compression effects of a receiver channel.

$$\Delta x = 1 - k_m x^{y_m} \quad (1)$$

$$\Delta \phi = k_p x^{y_p} \quad (2)$$

In equations (1) and (2), $k_m$, $k_p$, $y_m$, and $y_p$ are constants determined by fitting the functions of equations (1) and (2) to the measured magnitude and phase deviation data. The quantity x in equations (1) and (2) is the measured magnitude for the R channel. The quantities $\Delta x$ and $\Delta \phi$ are deviations observed in the phase and magnitude data, respectively. The constant $k_m$ is called a magnitude data multiplier, the constant $y_m$ is called a magnitude data exponent, the constant $k_p$ is called a phase data multiplier, and the constant $y_p$ is a phase data exponent. The magnitude terms in equations (1) and (2) are in linear form, not power (dB) form, so measured magnitude data is first converted from dB to linear or numeric form using the well known conversion given in equation (3)

$$x(lin) = 10^{\frac{x(dB)}{20}} \quad (3)$$

where x(lin) is the linear form of the data given in terms of power in dB as x(dB). Note, one skilled in the art is familiar with linear vs. dB power data and understands that the term "linear form", as used with respect to equations (1)–(3), is not related to the linear operational range of a device but merely pertains to whether the data is converted or is not converted to dB. The converted linear form of the measured magnitudes is provided in Table 1.

The R channel phase data exponent $y_p$ and phase data multiplier $k_p$ can be determined from equation (2) by using the two values obtained for phase deviation. Similarly, the magnitude data exponent $y_m$ and the magnitude data multiplier $y_m$ can be determined from equation (1) using the two values of magnitude deviation obtained for the compressed R channel 216a. Once the constants of equations (1) and (2) have been determined, the functions have been fitted to the data. The compensation necessary to correct the measured magnitude and phase responses of the R channel 216a then is given by equations (4) and (5) using the constants $y_p$, $k_p$, $y_m$, $k_m$ determined by fitting.

$$\Delta x_c = 1 + k_m x^{y_m} \quad (4)$$

$$\Delta \phi_c = -k_p x^{y_p} \quad (5)$$

The terms $\Delta x_c$ and $\Delta \phi_c$ are the R channel magnitude and phase compensation terms, respectively. For a given measured magnitude x for the R channel 216a, the corrected magnitude is computed by adding the compensation term $\Delta x_c$ (dB) to the measured magnitude x (dB). Similarly, for a given measured phase $\phi$ measured for a given magnitude x for the R channel 216a, the corrected phase is computed by adding the phase compensation $\Delta \phi_c$ to the measured phase $\phi$. Table 2 lists the constants determined for the example measured values of Table 1.

TABLE 2

R channel fitted constants for the example.

| Channel | $k_m$ | $y_m$ | $k_p$ | $y_p$ |
|---|---|---|---|---|
| R | 0.01030 | 2.296 | 0.01622 | 1.590 |

The example using method 100 continues with characterizing 120 the B channel 216b. For the example, the R channel 216a and the B channel 216b are both driven into compression by removing the attenuator 222, applying 122 the signal $S_{inc}(t)$, and measuring 124 the R channel and the B channel phase and magnitude responses for each of the power levels, P1, P2 and P3, of the input signal $S_{inc}(t)$. FIG. 5B illustrates a configuration of the network analyzer 200 for characterizing 120 the B channel for the example.

Since both channels are in compression, the deviations for the R channel 216a determined in characterizing 110 are extracted from the measured magnitude and phase values for the B channel 216b. For example, if the measured phase deviation at power level P1 for the B channel 216b is −7 degrees, the actual B channel deviation is −4 degrees (i.e. −7−(−3)=−4). Similarly, if the magnitude deviation at power level P1 is measured to be −1.1 dB, removing the amount due to the R channel 216a, namely −0.5 dB, yields an actual B channel deviation of −0.6 dB. With the B channel deviations at two power levels, P1 and P2, equations (1) through (5) can be used again to determine 126 a compensation for the B channel 216*b*, as was done for the R channel 216*a*. For example, the constants for the compensation terms for Channel B might be as given in Table 3.

TABLE 3

B channel fitted constants for the example.

| Channel | $k_m$ | $y_m$ | $k_p$ | $y_p$ |
|---------|-------|-------|-------|-------|
| B | 0.01 | 2.1 | 0.015 | 1.8 |

As with characterizing 110 the R channel, the constants determined in the example for characterizing 120 the B channel can be used to compute a magnitude and a phase compensated for compression from a compressed magnitude and phase.

FIG. 5C illustrates a block diagram of a vector network analyzer 200 configured to test the DUT using compensation of measured data to extend the dynamic range. For the example hereinabove, the compensation is afforded by the determined constants and the equations (3) and (4). The constants and the equations (3) and (4) might be determined during a manufacturing 'calibration' and stored in memory of the network analyzer 200. Alternatively, the constants might be determined during a calibration process by a user prior to performing measurements on a DUT. In either case, the constants and the equations (3) and (4) are then used to correct measured data for a DUT in compensating 130.

Compensation, as provided by the method 100 of the present invention, has been shown to be very effective, resulting in dramatic increases in the effective dynamic range of the test system. One of ordinary skill in the art can readily extend the discussion of compensating for compression in VNAs according to the present invention to other test systems including, but not limited to, vector spectrum analyzers without undue experimentation.

As mentioned herein above, the method 100 may be applied at a plurality of frequencies within a range of frequencies. Further, if one or more of the receivers have a response that varies over frequency, the compensation 130 may be interpolated between measured frequency points to achieve compensation at frequencies other than those used to characterize the receivers. Many interpolation methods are well known to those skilled in the art and may be used for interpolation in accordance with the present invention.

As described hereinabove, an input signal having a plurality of levels is applied individually and sequentially to the receiver channels during the characterizations 110, 120, 120'. As an alternative, a signal that varies with time, such as a sine wave or a more complex signal, can be employed to characterize 110, 120, 120' the receiver channels. One skilled in the art is familiar with signals that have an amplitude that varies as a function of time and can readily recognize that the application of such a signal may be viewed as a sequential application of a plurality of signal levels. Thus, such a signal (e.g., sine wave) may be substituted for the individually and sequentially applied plurality of levels without departing from or exceeding the scope of the present invention. Moreover, channel characterization 110, 120, 120', in terms of any of various distortion measures known in the art, especially those employing complex time varying signals, are within the scope of the present invention.

In another aspect of the present invention, a test system 300 having extended dynamic range is provided. Preferably, the test system 300 employs the method 100 of the present invention. The test system 300 provides compensation for measured data taken using a device under test (DUT) or a signal under test (SUT), where the compensation corrects for compression of one or more receiver channels of the test system 300. The compensation applies to magnitude and phase measurements produced by the test system 300. The test system 300 may be any test system that measures magnitude and phase including, not limited to, a vector network analyzer and a vector spectrum analyzer.

Figure 6:
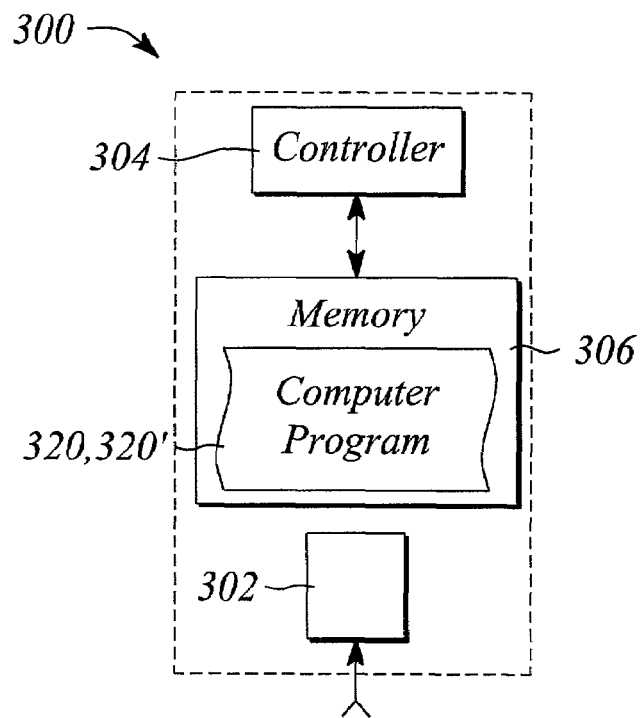
FIG. 6 illustrates a block diagram of a test system having extended dynamic range through compression compensation according to the present invention.

The test system 300, illustrated as a block diagram in FIG. 6, comprises a receiver channel 302, a controller 304, a memory 306 and a computer program 320 stored in the memory 306. The controller 304 is typically a microprocessor or microcontroller while the memory 306 is normally a form of computer memory including, but not limited to, random access memory (RAM) and/or read only memory (ROM). The receiver channel 302 receives a signal and measures magnitude and phase of the signal to generate magnitude and phase data. The controller 304 executes the computer program 320 and processes the generated magnitude and phase data. In part, the computer program 320 implements instructions that compensate for an effect on the generated data caused by compression of the receiver channel.

Figure 7:
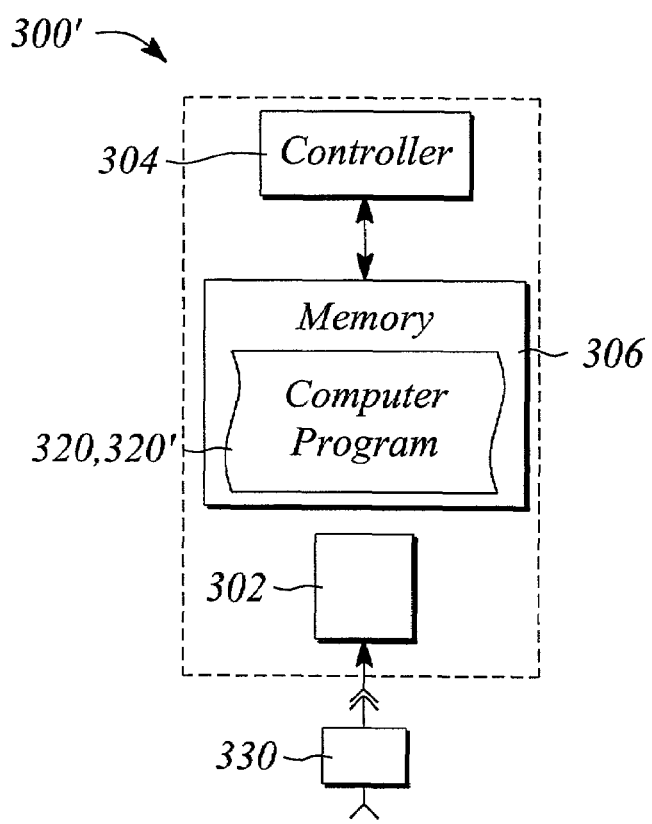
FIG. 7 illustrates a block diagram of another embodiment of a test system having extended dynamic range according to the present invention, wherein a limiter is used at a receiver input.

In some embodiments of the test system 300', a power limiter 330 or another equivalent, non-linear device may be used at an input of the receiver 302. FIG. 7 illustrates a block diagram of the test system 300' with the limiter 330. The addition of the limiter 330 reduces a power level of the signal applied to the receiver 302 by a greater amount at higher power levels, and a lesser amount at lower power levels. This non-linear reduction of power level is known as compression of the limiter 330. Preferably, the limiter 330 compresses at a power level that is lower than one that causes damage to the receiver channel 302. More preferably, the limiter 330 compresses at a power level that is below a compression power level of the receiver channel 302 or at least below a power level that causes a compression response of the receiver channel 302 to be not well-behaved. As used herein, a well-behaved compression response is one that is monotonic with respect to power. In any case, the limiter 330 at the receiver 302 input produces the compression effects instead of or in addition to a receiver channel 302 of the test system 300'. Moreover, in such embodiments of the test system 300', the instructions implemented by the computer program 320 further compensate for an effect on the generated data caused by the limiter 330 being compressed.

Figure 8:
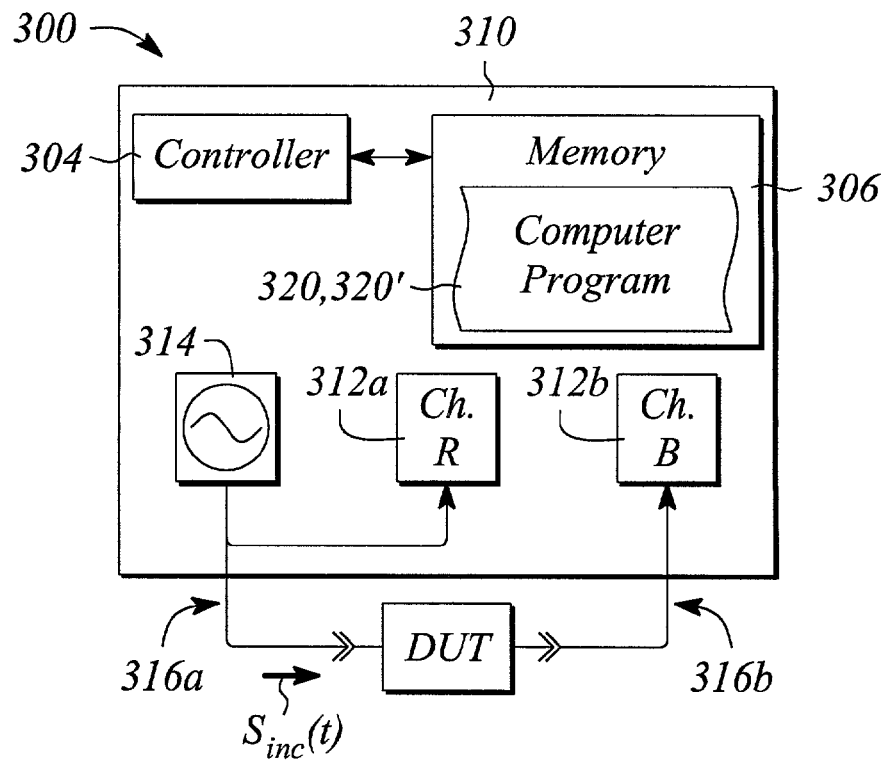
FIG. 8 illustrates a block diagram of the test system of the present invention in the form of a vector network analyzer.

FIG. 8 illustrates a block diagram of the test system 300 of the present invention in the form of a vector network analyzer (VNA) 310 for measuring the magnitude and phase response of a device under test (DUT). In particular, the VNA 310 comprises the controller 304, the memory 306, and the computer program 320 of the test system 300. However, in place of the receiver channel 302, the VNA 310 comprises a first or reference (R) receiver channel 312*a* and a second (B) receiver channel 312*b*. Moreover, the VNA 310 further comprises a signal source 314 and has a first test port 316*a* and a second test port 316*b*. The signal source 314 is connected to the R channel 312*a* and to the first test port 316*a*. The second test port 316*b* is connected to the B channel 312*b*. A DUT is connected between the first and second test ports 316*a*, 316*b* during a test of the DUT to measure magnitude and phase data for the DUT.

During such a test, a signal generated by the signal source 314 is applied to the R channel 312a and through the first test port 316a to an input of the DUT. The signal, having passed through the DUT, is then applied to the B channel 312b via the second test port 316b. Thus, the first test port 316a may be viewed as sourcing a signal and the second test port 316b may be a signal sink. The R channel 312a and B channel 312b each measures magnitude of the signal at their respective inputs and generates magnitude data. The R channel 312a and B channel 312b each further measures phase of the signal at their respective inputs and generates phase data. The phase data is generated as a phase difference between the signal at the R channel 312a and the signal at the B channel 312b.

As mentioned hereinabove, the controller 304 executes the computer program 320 and the executed computer program 320 implements instructions that perform magnitude and phase compensation due to compression effects. In particular, when executed, the computer program 320 computes and applies a compensation to measured magnitude and phase results produced by the test system 300, 300'. The compensation is preferably incorporated in the computer program 320 as a look-up table or as a set of functions and associated fitted constants. Moreover, in a preferred embodiment, the compensation is determined during a 'factory calibration' as part of a manufacture of the test system 300, 300', according to the method 100 of the present invention. For example, the VNA 310 can be calibrated at a factory during manufacture. The compensation can be determined and stored in memory at the factory for later use during DUT testing.

In other embodiments of the test system 300, 300', the computer program 320' implements the method 100 of the present invention. In these embodiments, the determination of the compensation can be performed as a factory calibration and/or periodically as a 'field calibration' by a user prior to measuring a DUT or SUT. In yet another embodiment, the test system 300, 300' further comprises a computer (not illustrated) that controls and processes data produced by the test system 300, 300'. In this embodiment, the computer program 320, 320' preferably resides in a memory of, and is executed by, the computer, instead of the controller 304 of the test system 300, 300'.

Figure 9:
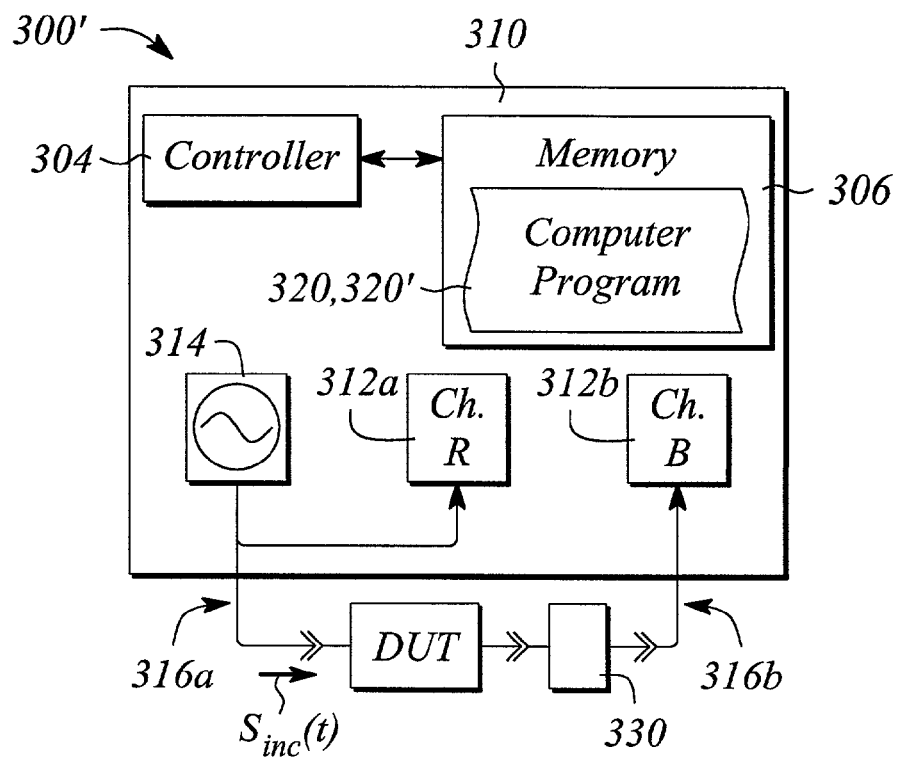
FIG. 9 illustrates a block diagram of the test system of the present invention in the form of a vector network analyzer, wherein a limiter is used at an input of a second receiver.

FIG. 9 illustrates the test system 300' in the form of a VNA 310 that employs a limiter 330 at an input to the B channel 312b. In addition, a limiter 330 may be used at an input to the R channel 312a (not illustrated). Moreover, in multiple channel VNAs, limiters 330 may be used at each receiver channel input. Alternatively, limiters 330 may be employed at inputs to only those receiver channels for which compression is likely during a DUT test.

Thus, there has been described a novel method 100 for extending the dynamic range of a test system and test system 300, 300' having extended dynamic range. The method 100 and the test system 300, 300' are applicable to test systems that produce vector measurements, including but not limited to vector network analyzers (VNAs), impedance analyzers, and vector spectrum analyzers. It should be understood that the above-described embodiments are merely illustrative of the some of the many specific embodiments that represent the principles of the present invention. Clearly, those skilled in the art can readily devise numerous other arrangements without departing from the scope of the present invention as defined by the following claims.

What is claimed is:

1. A method of extending dynamic range of a test system that has a receiver channel comprising:
compensating for an effect that compression of the receiver channel has on a magnitude response and a phase response of the receiver channel,
wherein compensating comprises:
characterizing a first receiver channel of the test system for a first magnitude compression response and a first phase compression response;
characterizing a second receiver channel of the test system for a second magnitude compression response and a second phase compression response;
compensating magnitude and phase data for the compression responses of each of the channels, the magnitude and phase data being measured by the first channel and the second channel; and
providing compensated magnitude data and compensated phase data as an output product of the test system.

2. The method of claim 1, wherein compensating further comprises correcting data measured for one of a device under test and a signal under test using the test system.

3. The method of claim 1, wherein the test system is one of a network analyzer and a spectrum analyzer.

4. The method of claim 1, wherein characterizing the first receiver channel, characterizing the second receiver channel, and compensating data are performed sequentially at one or more of a plurality of different frequencies within a range of frequencies.

5. The method of claim 4, wherein the compensation is interpolated so as to correct for the effect of compression on the magnitude and phase measurement data at frequencies other than those frequencies included in the plurality of different frequencies.

6. The method of claim 1, wherein the first channel is characterized comprising:
using an input signal to drive the first channel into compression, the input signal having a plurality of power levels, at least one of the power levels driving the first channel into compression;
measuring the first magnitude compression response and the first phase compression response of the first channel; and
determining a magnitude compensation and a phase compensation for the first channel as a function of the plurality of power levels of the input signal.

7. The method of claim 6, wherein the input signal is applied to the second channel, the second channel being non-compressed by the plurality of power levels, and wherein the first phase compression response is measured relative to the non-compressed second channel.

8. The method of claim 6, wherein after determining the compensations, the second channel is characterized comprising:
using the input signal to drive the first channel and the second channel into compression, the input signal having the plurality of power levels, at least one of the power levels further driving the second channel into compression;
measuring the magnitude compression response and the phase compression response of the second channel, the phase compression response of the second channel being measured relative to the first channel; and
determining a magnitude compensation and a phase compensation for the second channel as a function of the plurality of power levels using the determined magnitude compensation and the determined phase compensation of the first channel.

9. The method of claim 6, wherein after determining the compensations, the second channel is characterized comprising:
   using another input signal to drive the first channel and the second channel into compression, the input signal having another plurality of power levels, at least one of the power levels driving both channels into compression;
   measuring the magnitude compression response of the first channel and the magnitude compression response and the phase compression response of the second channel, the phase compression response of the second channel being measured relative to the first channel; and
   determining a magnitude compensation and a phase compensation for the second channel as a function of the other plurality of power levels using the determined magnitude and phase compensations of the first channel and the measured magnitude compression response of the first channel.

10. The method of claim 6, wherein after determining the compensations, the second channel is characterized comprising:
   using another input signal to drive the second channel into compression, the input signal having another plurality of power levels, at least one of the power levels driving the second channel into compression, the first channel being non-compressed;
   measuring the second magnitude compression response and the second phase compression response of the second channel, the phase compression response of the second channel being measured relative to the first channel; and
   determining a magnitude compensation and a phase compensation for the second channel as a function of the plurality of power levels of the input signal.

11. The method of claim 1, wherein the second channel is characterized comprising:
   using an input signal to drive the second channel into compression, the input signal having a plurality of power levels, at least one of the power levels driving the second channel into compression;
   measuring the second magnitude compression response and the second phase compression response of the second channel; and
   determining a magnitude compensation and a phase compensation for the second channel as a function of the plurality of power levels of the input signal.

12. The method of claim 11, wherein the input signal is applied to the first channel, the first channel being non-compressed by the plurality of power levels, and wherein the phase compression response of the second channel is measured relative to the non-compressed first channel.

13. The method of claim 1, wherein characterizing the first receiver channel and characterizing the second receiver channel each comprises:
   driving the receiver channel into compression, such that the channel has non-linear behavior; and
   determining a deviation from linear behavior of the compressed receiver channel.

14. The method of claim 13, wherein driving and determining are repeated at a plurality of different frequencies.

15. A method of extending dynamic range of a test system comprising:
   characterizing a reference receiver channel of the test system for a reference magnitude compression response and a reference phase compression response;
   characterizing a second receiver channel of the test system for a second magnitude compression response and a second phase compression response;
   compensating for an effect that compression of one or both of the reference channel and the second channel has on measured magnitude data and measured phase data; and
   storing results of characterizing the first receiver channel and of characterizing the second receiver channel.

16. The method of claim 15, wherein the reference channel is characterized comprising:
   applying an input signal to an input of the reference channel and to an input of the second channel, the input signal having a plurality of different power levels, wherein at least one of the power levels drives the reference channel into compression, while the second channel is non-compressed;
   measuring the reference magnitude compression response and the reference phase compression response of the reference channel, the phase compression response being measured relative to the second channel; and
   determining a magnitude compensation and a phase compensation for the reference channel as a function of the plurality of power levels of the input signal.

17. The method of claim 16, further comprising attenuating the input signal before the input signal is applied to the second channel to achieve the second channel non-compression.

18. The method of claim 17, wherein the second channel is characterized after the reference channel is characterized, comprising:
   further applying the input signal to the input of the reference channel, and further applying the input signal without attenuation to the input of the second channel, wherein at least one of the power levels drives both the second channel and the reference channel into compression;
   measuring the magnitude compression response and the phase compression response of the second channel, the phase compression response of the second channel being measured relative to the reference channel; and
   determining a magnitude compensation and a phase compensation for the second channel as a function of the plurality of power levels using the determined magnitude compensation and the determined phase compensation of the first channel.

19. The method of claim 15, wherein the second channel is characterized comprising:
   applying another input signal to the input of the second channel and to the input of the reference channel, the other input signal having another plurality of power levels, wherein at least one of the power levels drives the second channel into compression;
   measuring the second magnitude compression response and the second phase compression response of the second channel, the second phase compression response being measured relative to the reference channel; and
   determining a magnitude compensation and a phase compensation for the second channel as a function of the other plurality of power levels of the other input signal.

20. The method of claim 15, wherein compensating comprises using magnitude compensations and phase compensations determined for the reference channel and the second channel to connect the measured data.

21. The method of claim 20, wherein the measured magnitude data and the measured phase data are measured for one of a device under test and a signal under test using the reference channel and the second channel of the test system.

22. The method of claim 15, wherein characterizing the reference channel and characterizing the second channel are performed periodically, while compensating is performed for each data measurement of one of a device under test and a signal under test.

23. The method of claim 15, wherein the test system comprises more channels than the reference channel and the second channel, and wherein characterizing is performed sequentially for different pairs of channels in the test system.

24. The method of claim 15, wherein the test system comprises a single receiver channel, one of the reference channel and the second channel being an implicit channel.

25. The method of claim 15, wherein characterizing the reference receiver channel, characterizing the second receiver channel, and compensating are performed sequentially at one or more frequencies.

26. A test system having extended dynamic range comprising:
 a receiver channel;
 a controller that processes magnitude data and phase data generated by the receiver channel;
 a computer program stored in memory, the computer program being executed by the controller, the computer program implementing instructions that compensate for an effect on the generated data caused by the receiver channel being compressed;
 another receiver channel; and
 a signal source;
 wherein the signal source generates a signal that is applied to the receiver channel, to an input of a device under test, and after passing through the device under test, to the other receiver channel, and wherein phase is measured as a phase difference between the receiver channels.

27. The test system of claim 26, further comprising:
 a power limiter connected to an input of the other receiver channel, wherein the instructions implemented by the computer program further compensate for an effect on the generated data caused by the limiter being compressed.

28. A test system having extended dynamic range comprising:
 a receiver channel;
 a controller that processes magnitude data and phase data generated by the receiver channel;
 a computer program stored in memory, the computer program being executed by the controller, the computer program implementing instructions that compensate for an effect on the generated data caused by the receiver channel being compressed,
 wherein the computer program further implements instructions that drive the receiver channel into compression, such that the channel has non-linear behavior; and that determine a deviation from linear behavior of the compressed receiver channel, the deviation being the effect on the generated data.

29. The test system of claim 28, further comprising:
 a power limiter connected to an input of the receiver channel, wherein the instructions implemented by the computer program further compensate for an effect on the generated data caused by the limiter being compressed.

30. The test system of claim 28, wherein the test system is one of network analyzer and a spectrum analyzer.

* * * * *

UNITED STATES PATENT AND TRADEMARK OFFICE
CERTIFICATE OF CORRECTION

| | | |
|---|---|---|
| PATENT NO. | : 7,231,308 B2 | Page 1 of 1 |
| APPLICATION NO. | : 10/027751 | |
| DATED | : June 12, 2007 | |
| INVENTOR(S) | : Dunsmore et al. | |

It is certified that error appears in the above-identified patent and that said Letters Patent is hereby corrected as shown below:

In column 20, line 65, in Claim 20, delete "connect" and insert -- correct --, therefor.

Signed and Sealed this

Twenty-third Day of October, 2007

JON W. DUDAS
*Director of the United States Patent and Trademark Office*